United States Patent [19]

Jacobson

[11] Patent Number: 4,584,435
[45] Date of Patent: Apr. 22, 1986

[54] MINIATURE TELEPHONE ANSWERING DEVICE WITH SINGLE HEAD CARRIAGE

[76] Inventor: Sava Jacobson, 8130 Orion Ave., Van Nuys, Calif. 91405

[21] Appl. No.: 554,265

[22] Filed: Nov. 22, 1983

[51] Int. Cl.$^4$ .................. H04M 1/65; G11B 21/16
[52] U.S. Cl. .................................................. 179/6.03
[58] Field of Search .............. 360/92, 105, 96.4, 96.5; 179/6.01, 6.03, 6.07, 6.13

[56] References Cited

U.S. PATENT DOCUMENTS

| | | | |
|---|---|---|---|
| 3,959,591 | 5/1976 | Darwood | 179/6.13 |
| 3,968,329 | 7/1976 | Darwood | 179/6.03 |
| 4,394,697 | 7/1983 | Kurosawa | 179/6.03 |
| 4,445,000 | 4/1984 | Hashimoto | 179/6.03 |

*Primary Examiner*—Donald McElheny, Jr.

*Attorney, Agent, or Firm*—Spensley Horn Jubas & Lubitz

[57] ABSTRACT

In this telephone answering device utilizing microcassettes, a single head carriage carries the pinch rollers and heads for both the outgoing announcement and incoming message tape cassettes. The carriage is linearly movable between an engaged position and one or more retracted positions by a cam assembly utilizing a cam with missing teeth in two or more areas. The cam is driven between orientations established by the toothless areas, and is held in these areas by a selectively engaged pawl. A lever driven by the cam moves the unitary head carriage between engaged and retracted positions. A set of idler wheel slider assemblies is provided for selective driving of the source and takeup spindles of the two cassettes. These assemblies are selectively engaged in response to the position of the single head carriage and the direction of drive of the cassettes.

13 Claims, 8 Drawing Figures

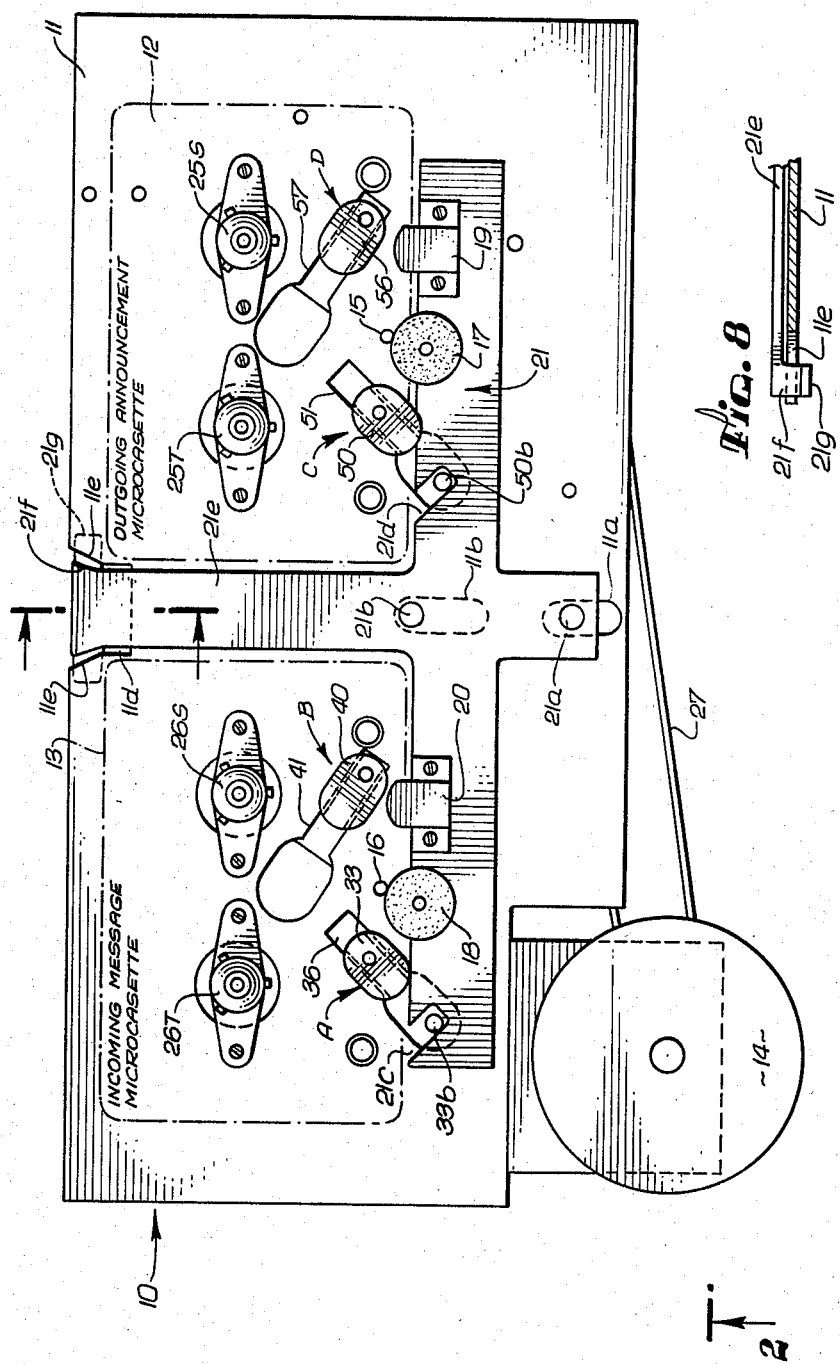

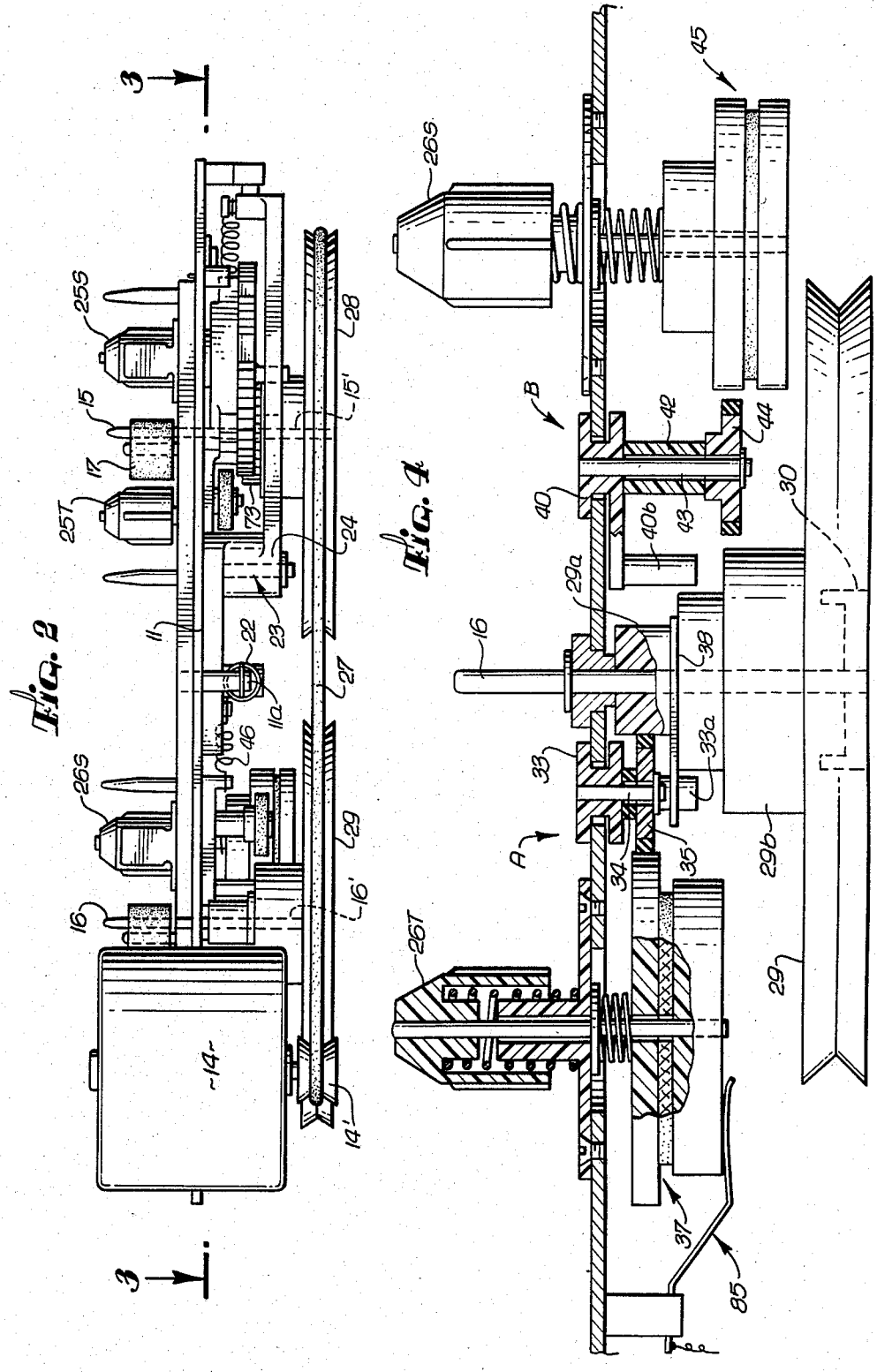

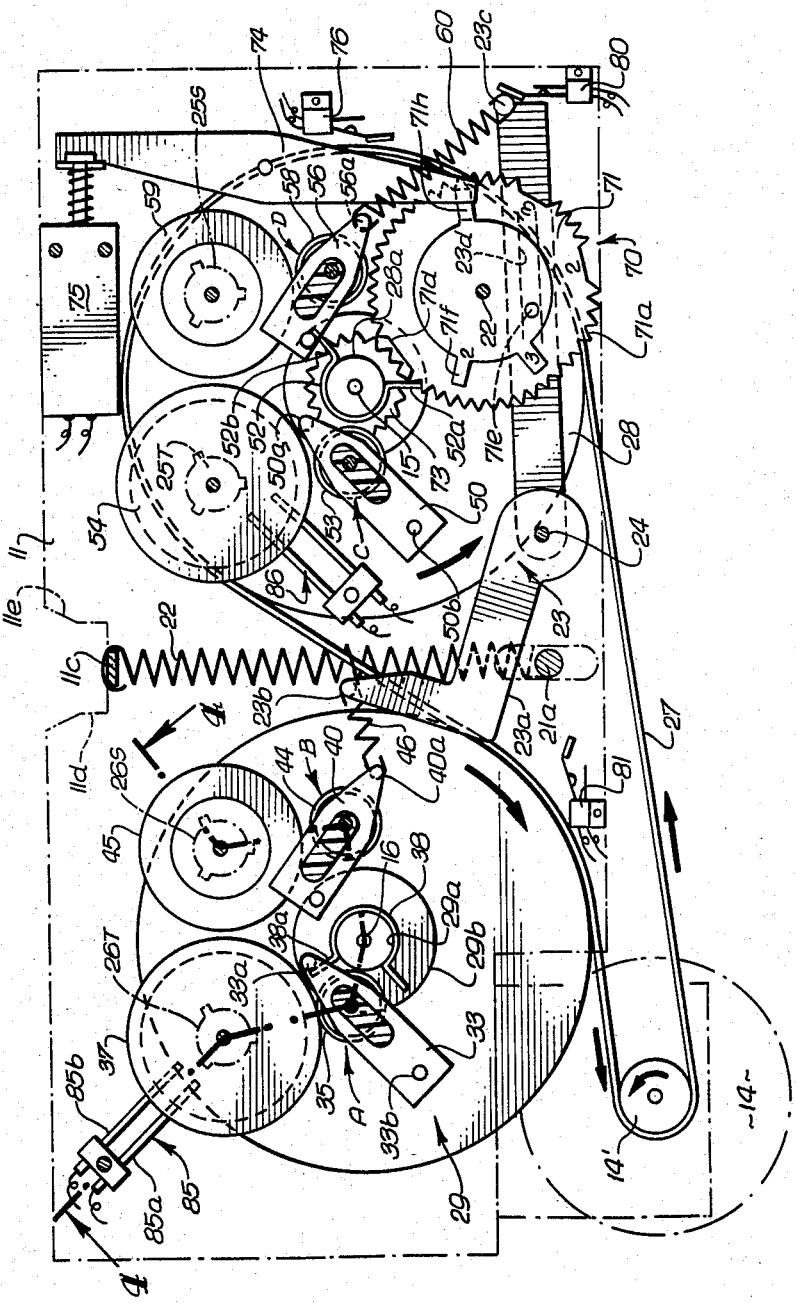

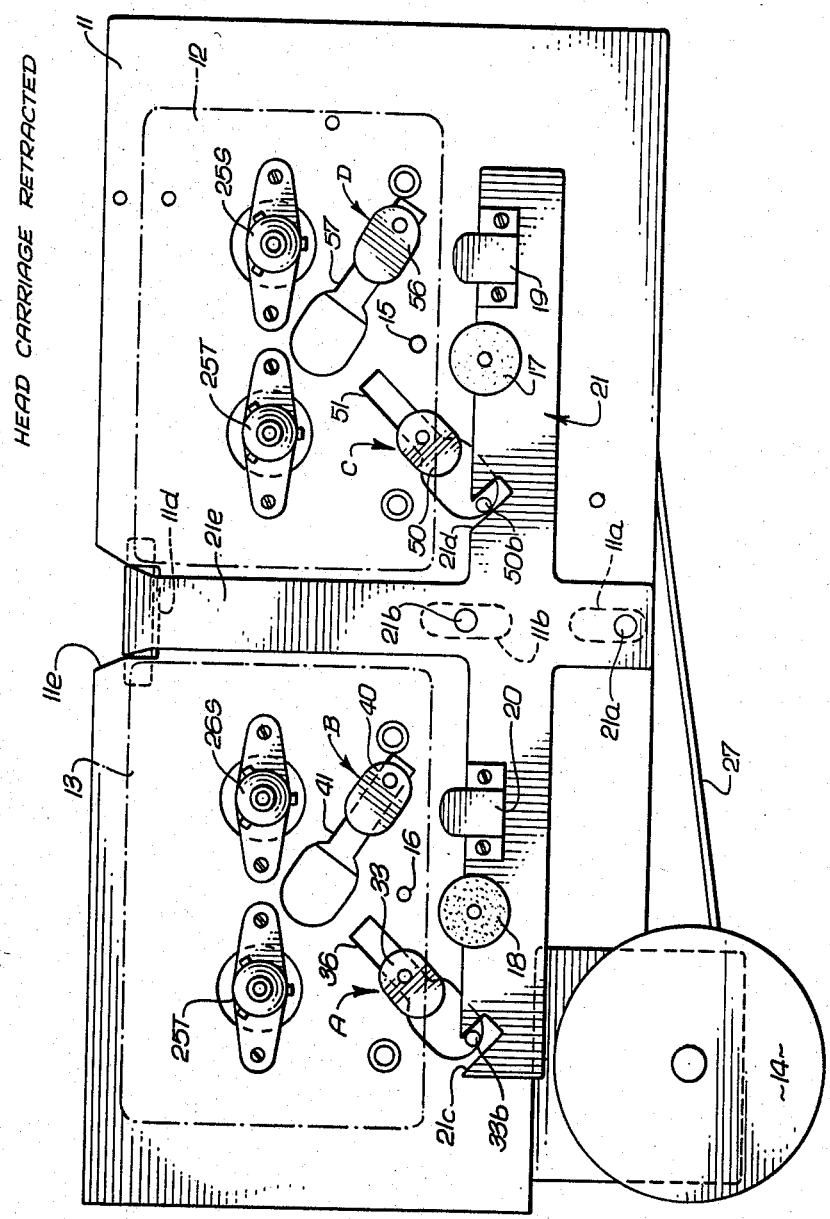

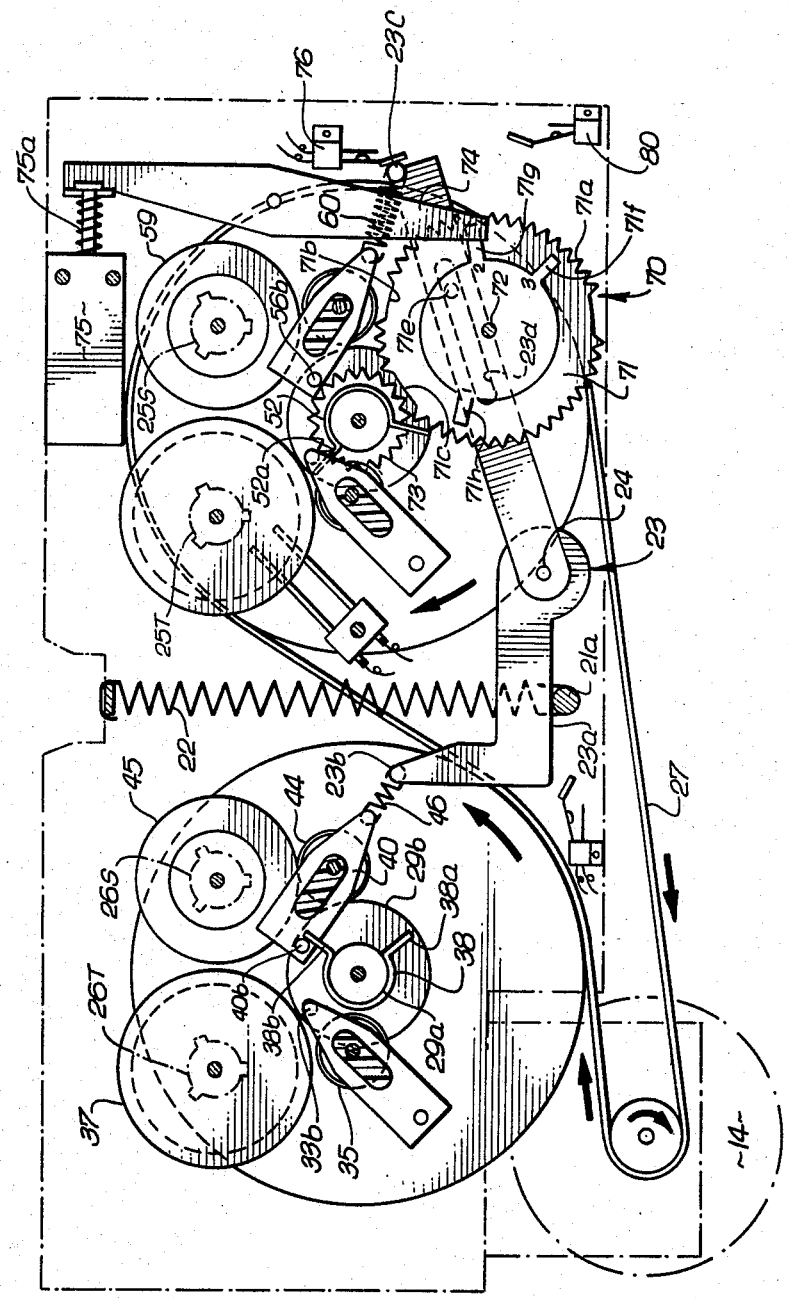

MINIATURE TELEPHONE ANSWERING DEVICE WITH SINGLE HEAD CARRIAGE

BACKGROUND OF THE INVENTION

1. Field of the Invention

The present invention relates to a miniature telephone answering device utilizing microcassettes and having a single head carriage, together with a cam assembly for positioning the carriage.

2. Description of the Prior Art

An objective of the present invention is to provide a telephone answering device which is small enough (typically 130 mm by 65 mm) to be placed beneath a telephone instrument. To accomplish such small size requires the use of microcassettes to record both the outgoing announcement and the incoming message. The requisite small size, and the use of microcassettes, introduce certain complications which must be appropriately handled by the device mechanism.

One of these complications is that there is presently no commercially widely available microcassette having an endless loop. In telephone answering devices using standard size tape cassettes, the outgoing announcement advantageously is recorded on such an endless loop. Thus after transmission of the outgoing announcement, the loop has already recirculated to its start position, so that no "rewind" of the announcement tape is required.

However, if the telephone answering device is to use a conventional microcassette for the outgoing announcement, provision must be made to rewind this cassette as part of the answering cycle. Advantageously, this is done at the end of the answering operation, after the incoming message has been recorded, so that there is no time delay between completion of the outgoing announcement transmission and initiation of recording of the incoming message. Accordingly, it is an object of the present invention to facilitate the automatic rewind of an outgoing announcement microcassette.

Because of the desired size limitation, it is advantageous to have the pinch rollers and record/playback heads for both the outgoing announcement and incoming message tape cassettes mounted on the same head carriage. Such an arrangement should minimize the mechanical complexity of the answering device. It is a further object of the present invention to provide such a unitary head carriage.

To utilize such a unitary head carriage requires some mechanism to ensure that in the engaged position, the pinch rollers for both the outgoing and incoming cassettes are firmly in contact with their respective tape drive capstans. If all of the mechanical components of the device, both on the chassis and on the head carriage itself are perfectly symmetric, then uniform contact of the pinch rollers with the capstans normally can be achieved by direct forward translation of the unitary head carriage from a retracted to an engaged position. However, typical manufacturing variations can be expected to result in some asymmetry of component placement. Therefore, provision must be made to permit sufficient lateral play in the head carriage so that affirmative contact between both pinch rollers and their associated capstans can be ensured when the head carriage is engaged.

On the other hand, such lateral play is undesirable when the head carriage is retracted. In that condition, lateral play could result in a situation where one or the other of the pinch rollers or heads interferes with free tape movement during a rewind or fast forward operation. Thus a further object of the present invention is to provide a head carriage arrangement that permits lateral play in the engaged position but prohibits such lateral play when retracted.

Yet another objective is to provide a drive control mechanism that is useful for both local and remote controlled telephone answering device operation. Local operation requires normal forward and rewind of both the outgoing announcement and incoming message microcassettes. In addition, remote controlled playback of previously recorded incoming messages also requires a fast forward of the incoming tape. Thus five separate tape drive modes must be implemented. A further object of the present invention is to implement these five tape drive operations in a telephone answering device of small size and utilizing microcassettes.

SUMMARY OF THE INVENTION

These and other objectives are achieved by providing a miniature telephone answering device utilizing microcassettes to record both the outgoing announcement and incoming messages. Advantageously, the device is dimensioned to fit beneath a standard telephone instrument. The pinch rollers and heads for both cassettes are mounted on a generally cruciform-shaped unitary head carriage.

The head carriage translates forward and backward between an engaged position and a retracted position. One arm of the head carriage has a flared end that is positioned within a notch in the chassis. When engaged, the flared end is free to move laterally with respect to slanted sides of the notch. This enables sufficient lateral play to ensure that when the head carriage is biased to the engaged position, both of the pinch rollers will affirmatively contact their respective capstans. When the head carriage is retracted, the flared end seats within a parallel-sided portion of the notch. Lateral play is prevented.

The head carriage is moved by a cam assembly that is driven by the same single motor which drives both tape cassettes. It includes a cam with peripheral teeth that are missing in three areas. This cam is held in one of the three areas by a pawl which engages three associated tabs on the cam. A pin projecting from the cam moves a pivoted lever arm which in turn moves the head carriage between the engaged position, midposition and retracted position.

The single drive motor is reversible. A cluth and coupling arrangement is used that is generally of the type disclosed in the applicant's U.S. Pat. No. 4,385,205 entitled "Single Motor Drive Assembly For A Tape Cassette Telephone Answering Device". With such arrangement, motor rotation in one direction drives the capstan of the outgoing announcement tape, while rotation in the opposite direction drives the capstan of the incoming message record tape.

This arrangement provides the possibility of six separate operational modes, characterized by three head carriage positions (engaged, retracted, midposition) and two motor rotation directions (clockwise and counterclockwise).

A set of idler wheel slider assemblies is employed in cooperation with the cassette drive mechanism and the head carriage positioning assembly. These cooperate so as to implement the five separate operational modes for the two tape cassettes, mainly, normal forward operation of the outgoing and incoming cassettes, rewind of the outgoing and incoming cassettes, and fast forward of the incoming cassette. Such mechanical arrangements thus facilitate automatic telephone answering operation and remote controlled playout of previously recorded incoming messages.

BRIEF DESCRIPTION OF THE DRAWINGS

A detailed description of the invention will be made with reference to the accompanying drawings wherein like numerals designate corresponding elements in the several figures.

FIG. 1 is a top plan view of the inventive miniature telephone answering device utilizing magnetic tape microcassettes and having a single head carriage with simplified mechanical mode controls. The head carriage is shown in the engaged position.

FIG. 2 is a front elevation view of the device of FIG. 1, as viewed along the line 2—2 thereof, showing various components of the single motor microcassette drive and mode switching assembly.

FIG. 3 is a top sectional view, as viewed along the line 3—3 of FIG. 2, of the inventive microcassette drive and mode switching assembly, shown in the head carriage engaged position.

FIG. 4 is a side sectional view of the drive assembly components associated with the incoming message microcassette, as viewed along the line 4—4 of FIG. 3.

FIG. 5 is a top plan view of the device of FIG. 1, but with the head carriage in the retracted position.

FIG. 7 is a top sectional view like FIG. 3, but with the head carriage in the midposition.

FIG. 8 is a fragmentary sectional view, as viewed along the line 8—8 of FIG. 1, showing the arrangement for permitting limited lateral movement of the head carriage only in the engaged position.

DESCRIPTION OF THE PREFERRED EMBODIMENT

Figure 6:
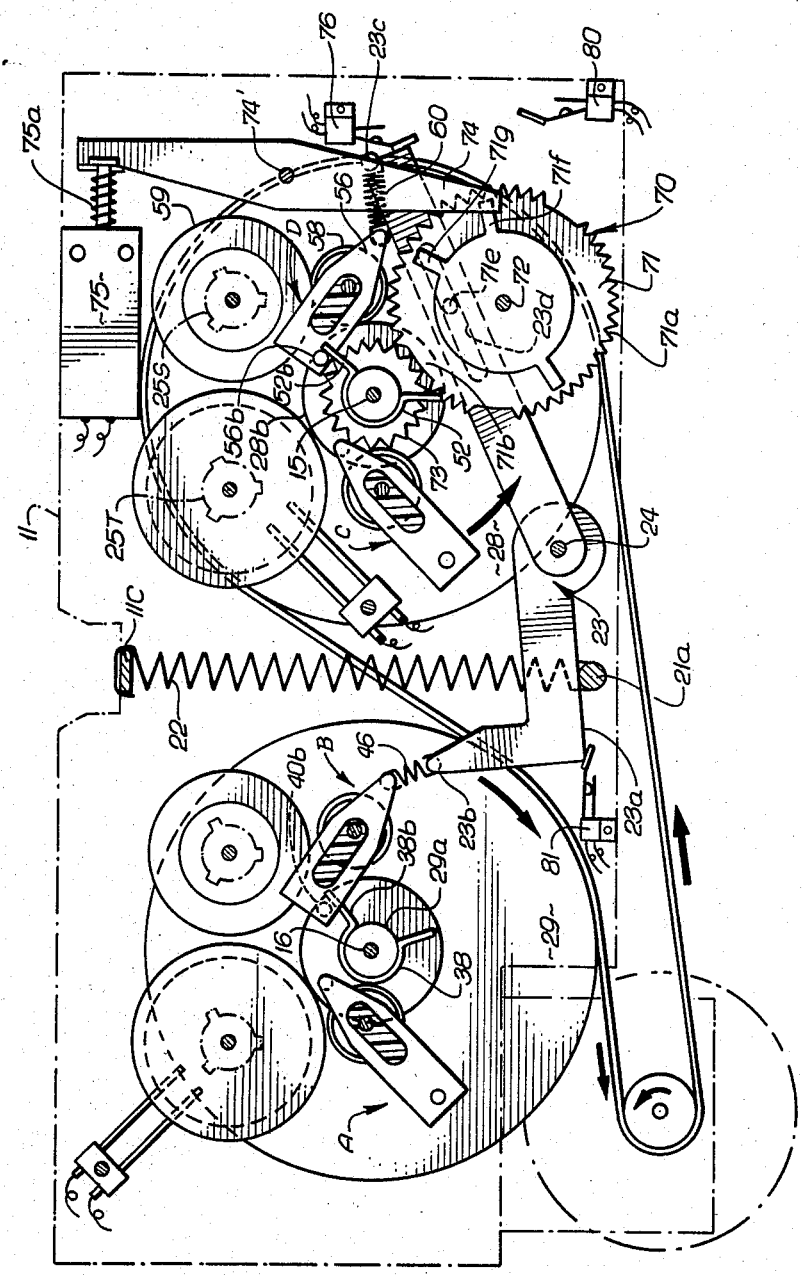
FIG. 6 is a top sectional view like FIG. 3, but with the head carriage in the retracted position also shown in FIG. 5.

The following detailed description is of the best contemplated mode of carrying out the invention. This description is not to be taken in a limiting sense, but is made merely for the purpose of illustrating the general principles of the invention, since the scope of the invention best is defined by the appended claims.

As shown in FIG. 1, the inventive telephone answering device 10 is mounted on a chassis 11 which is dimensioned (typically 130 mm by 65 mm) to fit beneath a conventional telephone instrument. The outgoing announcement and the incoming messages respectively will be recorded on conventional microcassettes 12, 13 shown in phantom in FIG. 1.

A single motor 14, having a reversible direction of rotation, is used for alternately driving one or the other of two microcassettes 12, 13 and to power the inventive mode selection mechanism. The manner in which the motor 14 alternately drives one or the other of the microcassette capstans 15, 16 is in accordance with the teachings of the inventor's U.S. Pat. No. 4,385,205 entitled "Single Motor Drive Assembly For A Tape Cassette Telephone Answering Device".

In accordance with the present invention, the pinch rollers 17, 18 and the record heads 19, 20 for both microcassettes 12, 13 are mounted on a single, generally cruciform-shaped head carriage 21. Two guide pins 21a, 21b extend downwardly from the carriage 21 through respective guide slots 11a, 11b in the chassis 11. This facilitates guided sliding movement of the head carriage 21 toward or away from the microcassettes 12, 13.

The head carriage 21 has three operational positions. In the first or "engaged" position (FIGS. 1 and 3), the pinch rollers 17, 18 engage the respective outgoing and incoming tapes (not shown) against the pinch rollers 15, 16. The heads 19 and 20 are in contact with the respective tapes so as to permit recording or playback from the outgoing announcement or incoming message microcassettes. The carriage 21 is biased into this engaged position by a spring 22 (FIGS. 2 and 3) stretched between the guide pin 21a and a tab 11c which depends from the chassis 11.

The second or "retracted" operational position of the head carriage 21 is shown in FIGS. 5 and 6. Here, the pinch rollers 17, 18 and the heads 19, 20 are completely withdrawn from the microcassettes 12, 13 so as to permit unimpeded removal or insertion of these microcassettes. The carriage 21 is maintained in the retracted position by a cam-driven arm 23 (FIGS. 2 and 6) which pivots about a shaft 24 affixed to the chassis 11. A shoulder 23a of the arm 23 (FIG. 6) bears against the guide pin 21a so as to hold the head carriage 21 in the retracted position against the force of the spring 22. In the retracted position (FIG. 5) the typical spacing between the pinch roller 17, 18 and its respective capstan 15, 16 is about 4 mm.

In the "midposition", the head carriage 21 is about midway between the engaged and retracted positions. The pinch rollers 17, 18 thus are spaced about 2 mm from the respective capstans 15, 16. As shown in FIG. 7, the carriage 21 is held in the midposition by the arm 23 which has now been rotated slightly clockwise about the shaft 24 as compared with the retracted orientation of FIG. 6.

In each of the three positions ("engaged", "retracted" and "midposition") of the head carriage 21, the motor 14 can rotate either clockwise (CW) or counterclockwise (CCW). Thus there are six available operational configurations for the device 10. As indicated in the following TABLE I, five of these six configurations are used to implement a corresponding five operational modes for the telephone answering device 10.

TABLE I

| Position of head carriage 21 | Motor 14 rotates clockwise | Motor 14 rotates counterclockwise |
| --- | --- | --- |
| Engaged | Outgoing (O/G) tape Normal forward | Incoming tape Normal forward |
| Midposition | Incoming (I/C) tape Rewind | Incoming tape Fast forward |
| Retracted | no action | Outgoing tape Rewind |

Implementation of the various operational modes of TABLE I involves three separate but interrelated mechanisms. Two of these are principally related to the rotation reversal of the motor 14. These mechanisms accomplish:

(A) alternate drive of the capstans 15 and 16 in accordance with the motor 14 direction of rotation; and (B) the selective drive coupling (or inhibition of coupling) between the flywheels 28 and 29 and the source and takeup spindles 25S, 25T and 26S, 26T of the microcassettes 12 and 13 respectively.

The third mechanism accomplishes:

(C) positioning of the head carriage 21.

These are separately discussed below.

(A) Alternate Capstan Drive

The manner in which the direction of rotation of the motor 14 drives one or the other of the capstans 15, 16 is in accordance with the inventor's above-mentioned U.S. Pat. No. 4,385,205. To this end, a belt 27 extends from a pulley 14' on the shaft of the motor 14 around somewhat more than half of a flywheel 28 associated with the capstan 15 and around a smaller portion of the flywheel 29 associated with the capstan 16. With this belt configuration, rotation of the motor 14 in one direction will cause the flywheel 28 to rotate in the same direction and the flywheel 29 to rotate in the opposite direction (as indicated by the arrows in FIG. 3 for CCW rotation of the motor 14).

Each flywheel 28, 29 is connected to the corresponding capstan shaft 15', 16' by a respective one-way clutch such as the clutch 30 shown in phantom in FIG. 4. Exemplary clutch mechanisms are shown in the above-mentioned U.S. Pat. No. 4,385,205.

With the motor 14 rotating counterclockwise (as shown by the arrows in FIG. 3), the resultant clockwise rotation of the flywheel 29 will be imparted via the clutch 30 to cause CW rotation of the capstan 16. This will drive the incoming message tape in the normal forward direction, so long as the carriage 21 is in the engaged position (FIG. 1) with the pinch roller 18 pressing the tape against the capstan 16. The counterclockwise rotation of the flywheel 28, however, will not be imparted to the capstan 15, since the clutch associated with that capstan will be disengaged.

When rotation of the motor 14 is reversed, so as to be in the CW direction, only the flywheel 28 will impart rotation to the capstan 15. The clutch associated with the capstan 16 will be disengaged. Thus forward drive will only be imparted (via the capstan 15) to the outgoing announcement tape 12. In this manner, reversal of the motor 14 direction imparts drive rotation alternately to one or the other of the capstans 15 and 16.

(B) Selective Drive Coupling

In each of the operational modes listed in TABLE I, either the source or takeup spindle of a certain microcassette 12 or 13 must be driven with a rotational force provided by the respective one of the flywheels 28 and 29. On the other hand, for each such mode the driving of certain other spindles must be inhibited. The selective driving or inhibition of drive is accomplished in part by the use of four idler wheel slider assemblies A, B, C, D. The manner in which these cooperate with other system components first will be described in connection with FIGS. 1–4 in which the head carriage 21 is in the engaged position. Such description will indicate how the assemblies A–D facilitate mode switching between the normal forward operation of the outgoing announcement microcassette 12 (with the motor 14 rotating CW) and the normal forward operation of the incoming message microcassette 13 (with the motor 14 rotating CCW).

As best shown in FIGS. 1 and 4, the assembly A includes a slider 33 to which is attached a shaft 34 carrying an idler wheel 35. The slider 33 moves in an oblique slot 36 formed in the chassis 11, thereby enabling the wheel 35 to move into or out of peripheral contact with the conventional slip clutch 37 associated with the takeup spindle 26T. The wheel 35 also may contact a relatively small diameter forward drive cylinder 29a which is integral with the flywheel 29. Mutual contact of the wheel 35 with the cylinder 29a and the slip clutch 37 imparts forward rotation to the takeup spindle 26T.

Depending from the front end of the slider 33 is a finger 33a. A "hairpin" 38 tightly friction is clipped around the lower portion of the cylinder 29a. When the flywheel rotates clockwise as shown in FIG. 3, an end 38a of the hairpin 38 catches the finger 33a and pulls the slider assembly A into the operative position of FIGS. 3 and 4.

Accordingly, when the motor 14 is rotating CCW (as shown by the arrows in FIG. 3), the flywheel 29 and the drive cylinder 29a rotate clockwise, thereby causing operative engagement of the idler wheel 35 so as to impart CW rotation via the slip clutch 37 to the takeup spindle 26T. This will cause the incoming message tape, which is then being driven by the rotating capstan 16, to be wound onto the takeup reel of the microcassette 13. Although the rotational speed of the drive cylinder 29a and idler wheel 35 is greater than that required to accomplish tape takeup, the excess rotational speed is compensated for by slippage of the clutch 37.

When the motor 14 is reversed to the CW direction, the capstan 16 stops rotating. However, the flywheel 29 and the drive cylinder 29a now rotate CCW. This initially causes the hairpin 38 to rotate CCW out of contact with the finger 33a. Accordingly, the slider assembly A is free to slide away from contact with the drive cylinder 29a, and will be urged into this disengaged position by the CCW rotation of the drive cylinder.

For reasons described below, a pin 33b is provided at the rear end of the slider 33. This pin 33b extends into a slot 21c in the carriage 21, which slot is sufficiently large as to permit limited motion of the assembly A into and out of operative engagement with the cylinder 29a when the carriage 21 is in the engaged position.

The idler wheel slider assembly B (FIGS. 3 and 4) likewise consists of a slider 40 which moves in a slot 41 in the chassis 11 (FIG. 1) which extends at about a right angle to the slot 36. Depending from the slider 40 is a spacer 42 and a shaft 43 which carries a rewind idler wheel 44. During rewind of the incoming message tape (with the carriage 21 in the midposition of FIG. 7), the rewind idler will be in contact with a relatively large diameter rewind drive surface cylinder 29b that is integral with the flywheel 29 and with the periphery of a slip clutch 45 associated with the source spindle 26S.

Projecting downwardly from the rear end of the slider 40 is a short pin 40a (FIGS. 2 and 3) to which is attached to one end of a short spring 46. The other end of the spring 46 is attached to a pin 23b at one end of the arm 23. As shown in FIG. 3, when the carriage is in the engaged position, the arm 23 is situated so that the pin 23b is sufficiently far from the pin 40a so that the spring 46 is under tension and will urge the slider assembly B toward the lower right as viewed in FIG. 3. That is, it will urge the rewind idler away from, and out of contact with both the rewind drive surface cylinder 29b and the slip clutch 45. In this way, driven rotation of the source spindle 26S in the rewind direction is inhibited while the head carriage 21 is in the engaged position. (The friction force between the hairpin 38 and the cylinder 29a is less than the force of the spring 46.)

The slider assembly C is configured like the assembly A and includes a slider 50 which moves in a slot 51 in the chassis 11.

When the motor 14 rotates clockwise so as to impart CW rotation to the flywheel 28, an end 52a of a "hairpin" 52 catches a finger 50a at the front end of the slider 50. This pulls the idler wheel 53 of the assembly C into mutual contact with the forward drive cylinder 28a that is integral with the flywheel 28 and with the periphery of the slip clutch 54 associated with the takeup spindle 25T. Thus during the normal forward movement of the outgoing announcement cassette 12, with the capstan 15 rotating clockwise and engaged by the pinch roller 17, the takeup spindle 25T will be driven via the cylinder 28a, the wheel 53 and the slip clutch 54.

During CCW rotation of the motor 14, the CW rotation of the flywheel 28 and the cylinder 28a will urge the idler wheel 53 away from, and out of contact with both the cylinder 28a and the clutch 54. There is a pin 50b at the rear of the slider 50 that extends into a slot 21d in the carriage 21 (FIG. 1). However, this slot 21d likewise is sufficiently wide so as to allow requisite movement of the slider 50 and the wheel 53 between its driving and non-driving positions while the carriage 21 is in the engaged position.

A slider assembly D is like the assembly B. It includes a slider 56 which moves in a slot 57. The slider 56 carries an idler wheel 58 which in an engaged position (as shown in FIG. 6 for rewind of the outgoing announcement cassette 13) is in contact with both a rewind drive cylinder 28b on the flywheel 28 and with a slip clutch 59 associated with the source spindle 25S.

With the head carriage in the engaged position, the idler wheel 58 is held out of such operative engagement by means of a spring 60 that extends between a pin 56a at the rear of the slider 56 and a pin 23c at an end of the arm 23. With the carriage 21 engaged (FIG. 3), the spring 60 is under tension so as to hold the slider assembly D away from both the cylinder 28b and the slip clutch 59 so as to inhibit driving of the outgoing announcement source spindle 25S during normal forward operation of either the incoming or outgoing microcassette tapes. In this regard, even when the flywheel 28 is rotating CCW so that the hairpin 52 is in the position of FIG. 3 with its end 52b in contact with a pin 56b at the front end of the slider 56, the rearward force of the spring 60 will overcome the force provided by the hairpin 52. The hairpin 52 itself will slip about the cylinder 28a, but will not pull the slider 56 and wheel 58 into contact with the cylinder 28b.

Operation of the slider assemblies A-D with the head carriage 21 retracted is shown in FIGS. 5 and 6. Regardless of the direction of rotation of the motor 14, the assemblies A and C are held disengaged by operation of the slots 21c and 21d in the carriage 21. The upper edges of these slots 21c and 21d catch the respective pins 33b and 50b so as to force retraction of the corresponding sliders 33 and 50. This action maintains the sliders 33 and 50 retracted, even when the hairpin ends 38a or 52a urge the sliders forward. In case of such engagement, the hairpin 38 or 52 will merely slip about the respective cylinder 29a or 28a.

The slider assembly B also is inhibited when the carriage 21 is retracted. In this instance, the position of the arm 23 is such that the pin 23b is situated to the left of the axis of the slot 41 by a distance sufficient to place the spring 46 under tension. The resultant spring force maintains the slider assembly B retracted even though CCW rotation of the flywheel 29 will urge the hairpin end 38b into contact with a pin 40b at the forward end of the slider 40. The hairpin 38 will slip about the cylinder 29a.

The slider assembly D will not be inhibited, since the end of the arm 23 carrying the pin 23c now will be sufficiently close to the slider 56 so that the spring 60 will be relaxed. This will allow the assembly B to be carried into operative engagement with the rewind cylinder 28b.

This occurs during the outgoing tape rewind operation that takes place with head carriage 21 retracted and the motor 14 rotating counterclockwise. In this instance, the end 52b of the hairpin 52 engages the finger 56b at the front end of the slider 56. This carries the slider forward so that the idler wheel 58 engages both the rewind drive cylinder 28b and the clutch 59 associated with the source spindle 25S. Rewinding of the outgoing tape thus is facilitated. Of course, since the carriage 21 now is retracted (FIG. 5), the capstan 17 and the record head 19 both are spaced away from the tape so that they will not impede this rewind.

Operation of the slider assemblies A-D with the carriage 21 in the midposition is shown in FIG. 7. In this orientation the assembly C is held in the disengaged position by the force of the upper edge of the slot 21d (FIG. 1) acting against the pin 50b. However, the slot 21c is sufficiently wide to permit the assembly A to move between the engaged and disengaged positions even though the carriage 21 itself is in the midposition.

With the motor 14 rotating clockwise (as shown in FIG. 7), incoming message tape rewind takes place. To this end, the end 38b of the hairpin 38 engages the pin 40b at the front of the carriage 40 and urges the idler wheel 44 into mutual contact with the rewind drive cylinder 29b and the clutch 45 of the source spindle 26S. This forward motion is not inhibited by the spring 46. With the carriage 21 in midposition, the end of the arm 23 and the pin 23b now are aligned with the axis of the slot 41 so that there is minimum spacing between the pin 23b and the pin 40a at the rear of the slider 40. The spring 46 is relaxed, and does not overcome the forward movement imparted to the slider 40 by the hairpin 38. Also, since the carriage 21 is at midposition, the pinch roller 18 is spaced away from the capstan 16 so that incoming message tape is free to be rewound.

When the motor 14 is reversed into the counterclockwise direction, a fast forward of the incoming tape occurs. The end 38a of a hairpin 38 now engages the finger 33b and pulls the slider assembly A into operative engagement with the forward drive cylinder 29a. Since that cylinder now is rotating clockwise, corresponding CW rotation will be imparted via the idler 35 and the clutch 37 to the takeup spindle 26T. Since the pinch roller 18 is spaced away from the capstan 16, the tape speed is not determined by the rotational rate of that capstan. Therefore, the tape can be wound onto the takeup spindle 26T at the rate determined by the rotation of the flywheel 29.

During such incoming tape fast forward operation, the clockwise rotation of the rewind drive cylinder 29b will urge the idler 44 in the assembly B away from contact with the source spindle clutch 45, so that the fast forward operation will not be impeded.

With the head carriage in midposition, the end of the arm 23 carrying the pin 23c will be spaced further from the slider assembly D than in the retracted position of FIG. 6. As a result, the spring 60 will be under sufficient tension to maintain the assembly D in the non-engaged orientation, despite the force which may be exerted on the pin 56b by the hairpin 52. Thus rewind of the outgoing announcement will be inhibited.

(C) Head Carriage Positioning

Movement of the head carriage 21 between its three positions is accomplished by a cam assembly 70 best illustrated in FIGS. 3, 6 and 7. The assembly 70 utilizes a cam 71 having teeth 71a around its periphery. However, there are three regions 71b–71d at which teeth are missing. The cam 71 rotates about a shaft 72 affixed to the chassis 11, and is driven by a gear 73 (evident in FIG. 2) which is unitary with the flywheel 28.

Depending from the cam 71 is a pin 71e which fits into a slot 23d in the arm 23. As the cam 71 rotates clockwise, the pin 71e presses against the side of the slot 23d and accordingly rotates the arm 23 about the pivot 24.

All movement of the head carriage 21 between its three positions takes place with the cam 71 rotating clockwise, that is, with the motor 14 and the gear 73 rotating CCW. The cam 71 is held at one of three positions (corresponding to the three carriage positions) by a pawl 74 which engages one of three tabs 71f–71h on the cam 71.

Prior to initiation of an automatic answering cycle, the head carriage advantageously is in the retracted position of FIGS. 5 and 6. In this orientation, the pawl 74 engages the tab 71f on cam 71. The shoulder 23a on the arm 23 presses against the guide pin 23a so as to maintain the carriage 21 in its retracted position, against the force of the stretched spring 22. In this orientation of the cam 71, the toothless section 71b faces the gear 73. Thus, even though the motor 14, flywheel 28 and gear 73 may rotate either CW or CCW, no rotation is imparted to the cam 71 and the carriage 21 remains in the retracted position.

When a change of carriage position is enabled, for example in response to the detection of a telephone ring signal, a solenoid 75 will be energized, so as to rotate the pawl 74 (about its mounting shaft 74') out of contact with the tab 71f. The force of the spring 22 exerted via the guide pin 21a and shoulder 23a will urge clockwise rotation of the arm 23 about its pivot 24. In turn, this will urge the pin 71e to begin to rotate the cam 71 in a clockwise direction. Indeed, it will rotate the cam 71 sufficiently far so that the gear 73 will come in contact with the teeth on the cam 71 to the left of the gap 71b.

During a head positioning operation the motor 14 will be energized in the CCW direction, so that the gear 73 also will turn CCW. This will now rotate the cam 71 clockwise, thereby beginning to rotate the arm 23 clockwise about its pivot 24.

If the carriage 21 is to be moved into midposition, the solenoid 75 is pulsed once, so that the solenoid return spring 75a will return the pawl 74 into the position where it will intercept the tab 71g as the cam 71 rotates CW to the position shown in FIG. 7. During such rotation, the arm 23 will rotate to the position also shown in FIG. 7 and the force of the spring 22 will carry the carriage 21 to its midposition.

When the tab 71g abuts against, and is stopped by the pawl 74, the next toothless gap 71c will be aligned with the gear 73. Further rotation of the cam 71 will be inhibited, and the carriage 21 will remain at midposition. Note that actually gear 73 reaches the toothless gap 71c slightly before the tab 71g strikes the pawl 74. However, the cam 71 is carried further, into contact with the pawl 74, by the force of the spring 22 acting via the arm 23 and the pin 71e.

During a normal telephone answering operation the midposition of the carriage 21 is not used. Accordingly, the solenoid 75 may be maintained in its energized state, with the pawl 74 withdrawn, until the tab 71g has been rotated past the pawl. Advantageously, however, a switch 76 is provided which is closed by the pin 23c only when the head carriage 21 is in midposition (FIG. 7). Closure of the switch 76 enables the solenoid 75 to be pulsed a second time, so as to withdraw the pawl 74 from out of contact with the tab 71g. In either case, the gear 73 continues to rotate the cam 71 until the tab 71h abuts against the pawl 74, as shown in FIG. 3.

In the orientation of FIG. 3, the toothless gap 71d is aligned with the gear 73. The arm 23 is rotated sufficiently far clockwise so that the shoulder 23a is now out of contact with the guidepin 21a. The force of the spring 22 acts directly to hold the head carriage 21 in its engaged position with the pinch rollers 17 and 18 firmly against the capstans 15 and 16.

A switch 80 is closed by the pin 23c when the cam 71 and the arm 23 reach the engaged position shown in FIG. 3. Closure of the switch 80 informs the telephone answering device circuitry that transmission of the outgoing announcement now can begin. In response to such switch 80 closure, the motor 14 is driven clockwise so as to operate the outgoing announcement tape in the normal forward mode (TABLE I).

The end of the outgoing announcement is detected in the normal manner, e.g., by detecting the presence of a beep tone recorded on the outgoing tape at the end of the announcement. In response to such tone detection, the midcycle shift is actuated. In the device 10, this requires only the reversal of direction of rotation of the motor 14. By placing the motor 14 in the CCW direction, all movement of the outgoing announcement tape stops, and the incoming message tape is driven in the normal forward mode so as to enable recording of the incoming message.

Completion of recording of the incoming message is determined in a normal fashion, either by the elapse of a certain time duration, or by detecting that no further incoming speech is present. Thereafter, rewinding of the outgoing announcement microcassette must be carried out. This is accomplished by replacing the carriage 21 back to the retracted position.

To accomplish this, the solenoid 75 again is pulsed. The pawl 74 thus is pulled out of contact with the tab 71h. The force of the spring 60 now pulls the arm 23 in a counter-clockwise direction about its pivot 24. This in turn urges the pin 71e upward (as viewed in FIG. 3) so as to rotate the cam 71 clockwise. This rotation is sufficient to pull the teeth at the left of the gap 71d into contact with the gear 73. The motor 14 now is driven CCW, so as to drive the gear 73 CCW and hence to drive the cam 71 clockwise.

During this rotation, the arm 23 is driven counter-clockwise about the pivot 24. This pulls the carriage 21 toward its retracted position. The rotation continues until the tab 71f strikes the pawl 74 in the orientation shown in FIG. 6. The carriage 21 thus stops in the retracted position. In this position the shoulder 23a closes a switch 81 which confirms to the answering device circuitry that the carriage 21 is retracted.

The motor 14 now is driven CCW so as to rewind the outgoing announcement tape (TABLE I). When the rewind is complete, the answering cycle ends, leaving the device 10 ready for the next answering operation.

In telephone answering devices equipped for remote playout of previously recorded messages, a control tone is transmitted over the telephone line from a "beeper"

held by the user to the device 10. Typically this may occur while the device 10 is transmitting the outgoing announcement.

Conventional circuitry then may be used to detect the control tone and to switch the device 10 into an automatic playout mode. This first requires rewinding of the incoming message tape. This is accomplished by pulsing the solenoid 75 once to withdraw it from the tab 71h, and rotating the motor 14 CCW so as to drive the cam 71 CW until the pawl meets the tab 71f with the head carriage retracted. The solenoid 75 then is pulsed again, so that the cam 71 is enabled to move to the position shown in FIG. 7 with the tab 71g stopped by the pawl 74 with the carriage in the midposition. This position is confirmed by closure of the switch 76. The motor 14 then is run clockwise so as to accomplish incoming tape rewind (TABLE I).

The solenoid 75 is pulsed once more, and the motor driven CCW, so as to shift the head carriage to the engaged position of FIG. 3. The motor 14 then is run CCW, so that the incoming tape operates in the normal forward position but with the audio circuitry shifted to the playback mode so as to play out the previously recorded incoming messages. When such playback has been completed, the device returns to the normal answering mode and completes the automatic answering cycle.

Another feature of the invention is illustrated in FIGS. 1, 5 and 8. Due, e.g., to minor variations in manufacturing processes, there may be a slight asymmetry in the location of components on the right and left sides of the answering device 10. With such asymmetry, when the head carriage 21 is engaged with both of the pinch rollers 17, 18 in firm contact with the capstans 15, 16, the centerline of the rearward arm 21e of the head carriage 21 may not be exactly perpendicular to the front or rear edge of the chassis 11. Provision must be made to accommodate such possible yawing of the head carriage 21. This is accommodated by a relatively large notch 11d at the rear of the chassis 11.

On the other hand, when the head carriage 21 is retracted (FIG. 5) it is important that the lateral arms of the carriage 21 be substantially parallel to the front and rear edges of the chassis 11, so as to ensure the requisite clearance spacing between the capstans 15, 16 and the pinch rollers 17, 18. If the carriage 21 were free to rotate or yaw in the retracted position, it is possible that one or the other of the pinch rollers 17, 18 might project into the corresponding microcassette, and e.g., interfere with a tape rewind operation. The configuration of the notch 11d and the rear end of the carriage arm 21e cooperate to prevent yawing of the head carriage 21 in the retracted position.

For this purpose, the notch 11d is provided with slanted shoulders 11e and the carriage arm 21e has a flared end 21f. As shown in FIG. 8, this flared end 21f is of greater thickness than the remainder of the carriage arm 21e and projects downwardly through the notch 11d. A pair of projecting horizontal tabs 21g extend laterally beneath the chassis 11 to either side of the notch 11d.

With this arrangement, there is sufficient clearance between the slanted notch shoulders 11e and the flared end 21f to permit the carriage 21 to yaw slightly, thereby accommodating asymmetry in component positioning, and ensuring that both of the pinch rollers 17, 18 will be in firm contact with the respective capstans 15, 16 when the head carriage is engaged.

When the head carriage is retracted to the position of FIG. 5, the slanted shoulders 11e of the notch 11d guide the flared end 21f into the forward, non-flared portion of the notch 11d. With the flared end 21f located within this region of the notch 11d, yawing the carriage 21 is prevented. This ensures the lateral carriage arm will be substantially parallel to the front and rear edges of the chassis 11, thereby maintaining the requisite spacing between both of the pinch rollers 17, 18 and their respective capstans 15, 16. The same is true with the head carriage in midposition. The flared end 21f of the arm 21e still is captured within the inner unflared portion of the notch 11d so as to prevent yawing. In this manner, interference by the pinch rollers 17, 18 with the fast forward or rewind of the tape in either cassette is prevented.

Another feature of the invention, concerning a mechanism for detecting the end of rewind, is shown in FIGS. 3, 4, 6 and 7. As indicated therein, a pair of feelers 85 engages the slip clutch 37 associated with the takeup spindle 26T of the incoming message microcassette. A similar set of feelers 86 is associated with the slip clutch on the takeup spindle 25T of the outgoing microcassette.

Advantageously, each of these slip clutches has a lower rotating member that is made out of conductive plastic, for example, a plastic containing carbon granules. If an electric current is supplied to one of the feelers 85a (FIG. 3), it will be intermittently conducted via the slip clutch 37 to the other feeler 85b. The extent of conduction (i.e., the effective resistance between the feelers 85a and 85b) will vary as the spindle 26T and slip clutch 37 rotate. Alternatively expressed, noise will be injected into a circuit containing the feeler 85 during rotation of the spindle 26T.

Appropriate electrical circuitry senses this noise or variation in conductivity that occurs during rotation of the spindle 26T. (Such circuitry is shown e.g., in the inventor's U.S. Pat. No. 4,390,751 entitled End of Rewind Detection in a Telephone Answering Device Having Remote Playout.) Termination of such intermittent conductivity or noise, as sensed by the electrical circuit, indicates that rotation of the spindle 26T has stopped. This can be used as an indication, e.g., that rewind of the incoming message microcassette 13 has been completed. Utilization of the feeler 86 in a similar circuit likewise can indicate the end of rewind of the outgoing announcement microcassette 12. The feelers 85, 86 may be mounted to the chassis 11 by an insulated stud 87, as shown in FIG. 4.

I claim:

1. In a telephone answering device utilizing an outgoing announcement tape cassette and an incoming message tape cassette, the improvement comprising:
    a unitary carriage carrying the heads and pinch rollers for both said outgoing and incoming cassettes, and being selectively movable between an engaged position in which the pinch rollers and heads are in engagement with the respective cassettes, and one or more retracted positions in which the heads and pinch rollers are spaced from said cassettes,
    means for selectively controlling the operating mode of both said cassettes in response to the position of said head carriage.

2. In a telephone answering device utilizing an outgoing announcement tape cassette and an incoming message tape cassette and having means for selectively driving both of said cassettes, the improvement comprising:
  a unitary carriage carrying the heads and pinch rollers for both said outgoing and incoming cassettes, and being selectively movable between an engaged position in which the pinch rollers and heads are in engagement with the respective cassettes, and one or more retracted positions in which the heads and pinch rollers are spaced from said cassettes, and
  means for selectively controlling the operating mode of both said cassettes in response to the position of said head carriage and the direction of drive of said cassettes.

3. An improvement according to claim 2 wherein said means for selectively controlling comprises:
  first and second pairs of idler wheel slider assemblies associated respectively with said outgoing and incoming cassettes,
  each assembly having an idler wheel mounted on a slide, and each being slidable into and out of a position in which the associated idler wheel communicates rotation from a pulley member driven by said selective drive means to the respective one of the slip clutches associated with the source and takeup spindles of the associated tape cassette, and
  means for selectively engaging and disengaging each idler wheel slider assembly in response to head carriage position and direction of cassette drive.

4. The improvement of claim 3 wherein associated with each of said outgoing and incoming cassettes is a pulley member, said pulley members being concurrently driven in opposite directions with respect to one another, each pulley member having integral first and second regions of different diameter and each having a hairpin friction fitted about a region thereof,
  a respective one of each pair of idler wheel slider assemblies being urged into engagement by one end of said hairpin when said pulley member rotates in a first direction, and being urged out of such engagement by movement of said head carriage away from said engaged position, and
  the other of each pair of idler wheel slider assemblies being urged into engagement by the other end of said hairpin upon opposite rotation of said pulley member, and being urged out of engagement by a respective spring which is loaded in response to positioning of said head carriage assembly.

5. The improvement according to claim 4 wherein said hairpin has a generally arcuate section surrounding more than half of a region of said pulley member, said hairpin being in tight but slidable friction engagement with said pulley member,
  each end of said hairpin extending generally radially away from said pulley member,
  each of said idler wheel slider assemblies having a pin at its forward end, rotation of a pulley member in a first direction causing one end of said hairpin to engage the pin of one of said slider assemblies to pull the idler wheel of that assembly into engagement with a corresponding region of said pulley member and with the associated slip clutch, rotation of said pulley member in the opposite direction causing the other end of said hairpin to engage a pin at the forward end of the other of said idler wheel slider assemblies and to pull the idler wheel of that assembly into contact with the other region of said pulley member and with the associated slip clutch, and
  spring means connecting each other idler wheel slider assembly to the respective opposite ends of a lever arm that is pivoted in accordance with the positioning of said head carriage.

6. In a telephone answering device utilizing an outgoing announcement tape cassette and an incoming message tape cassette, the improvement comprising:
  a unitary head carriage carrying the heads and pinch rollers for both said outgoing and incoming cassettes, and
  cam assembly means for moving said head carriage between an engaged position, and one or more retracted positions, comprising:
    a circular cam having peripheral teeth, there being three spaced areas about the periphery without teeth, said cam being rotatable about a shaft,
    said cam having three tabs attached thereto and respectively associated with said three toothless areas,
    a pawl for selectively engaging one of said tabs.

7. In a telephone answering device utilizing an outgoing announcement tape cassette and an incoming message tape cassette, the improvement comprising:
  a unitary head carriage carrying the heads and pinch rollers for both said outgoing and incoming cassettes, and
  cam assembly means for moving said head carriage between an engaged position, a retracted position and a midposition therebetween, comprising:
    a circular cam having peripheral teeth, there being three spaced areas about the periphery without teeth, said cam being rotatable about a shaft,
    said cam having three tabs attached thereto and respectively associated with said three toothless areas,
    a pawl for selectively engaging one of said tabs,
    a pin projecting projecting normally from said cam,
    a drive gear driven by the drive assembly of one of said tape cassettes and mounted for driving engagement with the peripheral teeth of said cam,
    a pivotally mounted cam driven lever arm having a slot engaging the pin of said cam so as to be pivoted in response to rotation of said cam, and
    means interconnecting said head carriage and said lever arm so that said head carriage will be moved by said lever arm from said engaged to said midposition and said retracted position.

8. The improvement of claim 7 wherein said head carriage is biased to said engaged position, said head carriage including a projection engaging said cam driven lever arm, rotation of said cam by said drive gear from between a first toothless area to a second toothless area causing said lever arm to pivot and to move said head carriage from said engaged position to said midposition, continued driving of said cam by said drive gear from said second to the third toothless area causing said lever arm to move said head carriage from said midposition to said retracted position.

9. In a telephone answering device having a chassis and utilizing an outgoing announcement and incoming message tape cassettes, the improvement comprising:
  a generally cruciform-shaped head carriage carrying on respective lateral arms the pinch rollers and heads for the respective outgoing and incoming cassettes, said carriage being movable with respect to said chassis between engaged and retracted positions, and means for preventing yawing of said carriage in the retracted position, but permitting limited yawing in the engaged position to accommodate and ensure affirmative contact between both pinch rollers and their associated tape capstans.

10. The improvement of claim 9 wherein said means for preventing yawing comprises:
   a notch in said chassis, said notch having a slanted shoulder portion and a parallel edged portion, and
   said cruciform-shaped head carriage having a rearwardly projecting arm having a flared end, said flared end being situated within said slanted shoulder portion of said notch when said head carriage is engaged, said flared end being situated within, and prevented from lateral movement by, said parallel edged portion of said notch when said head carriage is in other than said engaged position.

11. In a telephone answering device having outgoing announcement and incoming message tape cassettes selectively driven by a single motor, the improvement comprising:
   a single head carriage carrying the pinch rollers and heads for both said outgoing and incoming tape cassettes, and being linearly movable between an engaged position in which the heads engage both cassettes and one or more retracted positions in which the heads and pinch rollers are sufficiently spaced from the cassettes so as to enable removal and replacement thereof,
   means for biasing said head carriage into said engaged position, and
   a cam assembly including:
      (a) a lever for moving said head carriage against said bias selectively into said midposition or said retracted position,
      (b) a cam with teeth missing in at least two areas, driven in one direction only by a gear which itself is driven by said single motor, thereby causing rotation of said cam between orientations established by said toothless areas, said lever being driven by said cam, and
      (c) pawl means for selectively engaging said cam while a toothless area is aligned with said drive gear to prevent rotation of said cam to the next position until said pawl is withdrawn.

12. The improvement of claim 11 further comprising:
   means for controlling the operation of said answering device in accordance with the orientation of said cam assembly.

13. The improvement according to claim 12 wherein said means for controlling includes switches selectively actuated by said lever when said head carriage is in a respective one of its operative positions.

* * * * *